Figure 1:
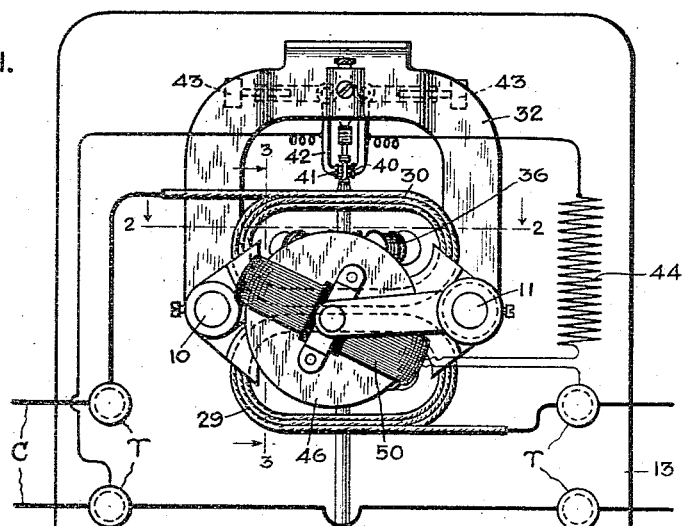

E. THOMSON.
ELECTRIC METER.
APPLICATION FILED APR. 6, 1916.

1,266,347.

Patented May 14, 1918.

Inventor,
Elihu Thomson,
by
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC METER.

1,266,347.   Specification of Letters Patent.   Patented May 14, 1918.

Application filed April 6, 1916. Serial No. 89,285.

*To all whom it may concern:*

Be it known that I, ELIHU THOMSON, a citizen of the United States, residing at Swampscott, county of Essex, State of Massachusetts, have invented certain new and useful Improvements in Electric Meters, of which the following is a specification.

My invention relates to electric meters, and particularly to direct current electric meters of the motor type. The invention more particularly relates to direct current meters of the type disclosed in my United States Patent No. 1,252,201, January 1, 1918, filed Oct. 10, 1914.

The object of the invention is to provide an improved electric motor meter, and especially to provide an improved direct current motor meter of the type described in my above mentioned application. More specifically the object of the invention is to provide an improved electric motor meter of the astatic type, and in this connection to provide an improved astatic direct current meter of the type described in my aforementioned application.

Considerable difficulty has heretofore been experienced in obtaining accurate meter operation in localities where local magnetic disturbances are unusually excessive, as for example, where the meters are installed near heavy electric current carrying conductors or within the influence of the magnetic field of conductors carrying heavy electric currents. The principal aim of my present invention is to provide an improved direct current motor meter which is substantially unaffected by local magnetic fields and which will operate with a high degree of accuracy even when installed in a locality where unusual magnetic influences exist. In its complete form the improved meter of my present invention comprises two small armatures of the ring construction wound on independent magnetic cores and arranged one above the other on the meter shaft, but electrically connected so that their magnetic polarities are relatively reversed, and surrounded by oval field coils, arranged one above the other, in which the winding polarities are reversed. While such a general astatic arrangement of two meter elements is not in itself new, I have provided a novel electrical connection of the armature coils to the commutator segments whereby corresponding top and bottom coils of the upper and lower armature windings, respectively, are connected in series and these series-connected coils are then connected as units to the segments of the commutator to form two series-connected ring windings. In addition I have provided a novel means for equalizing the effects of local stray fields on the two meter elements of the astatic combination, and have associated with this equalizing means a novel form of initial energy coil.

Figure 4:
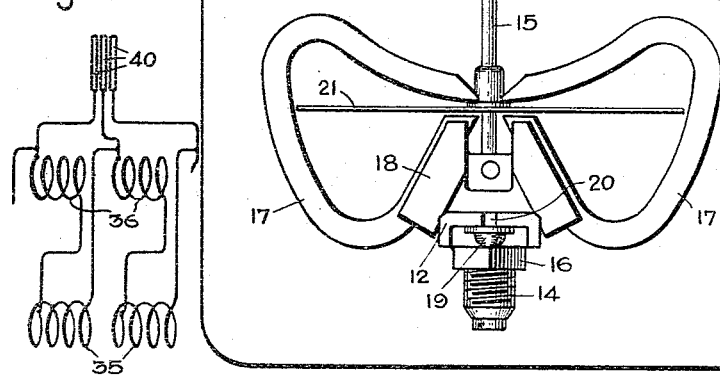
Figure 5:
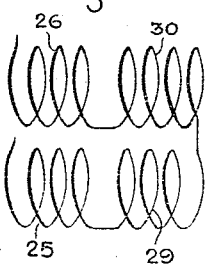
Figure 2:
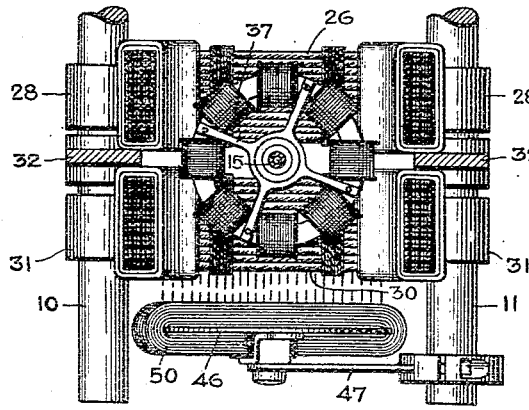
Figure 3:
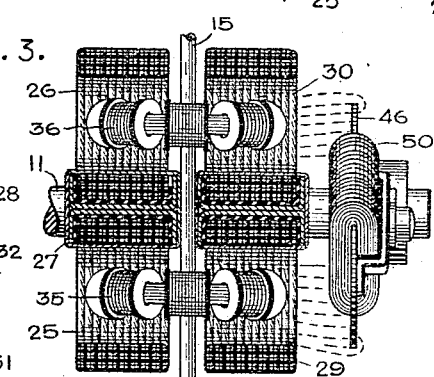

The novel features of my invention which I believe to be patentably characteristic thereof are definitely indicated in the claims appended hereto. These features of novelty together with the construction and operation of an electric meter embodying the same will be understood from the following description taken in conjunction with the accompanying drawings, in which;

Figure 1 is a front elevation of an electric meter embodying my present invention, with the cover and register removed to show more clearly the working elements of the meter; Fig. 2 is a sectional view taken on the section line 2—2 of Fig. 1; Fig. 3 is a sectional view taken on the section line 3—3 of Fig. 1; and Figs. 4 and 5 are diagrams of the electrical connections of the armature and field windings, respectively.

The operative elements of the meter illustrated in the accompanying drawings are mounted upon three supporting posts 10, 11 and 12 extending from and suitably secured to a base 13. The lower bearing 14 for the rotatable meter shaft 15 is screw-threaded in the supporting post 12 and is adapted to be secured in position by a lock nut 16. A pair of permanent magnets 17 secured to an attaching shoe 18 of non-magnetic material are adjustably mounted on the post 12 and are secured in their proper adjusted position by a set screw 19 extending through a slot 20 in the post 12 and operatively engaging the shoe 18. A damping disk 21 of conducting material is secured to the meter shaft 15 for rotation in the air gap between the poles of the magnets 17.

The meter has four series or current coils astatically arranged. The two rear coils 25 and 26 are vertically arranged and are secured together by clamps 27 having apertured lugs 28 adapted to slip over the supporting posts 10 and 11. The coils 25 and 26 are thus adapted to be assembled on the posts 10 and 11 as a single unit. The front field coils 29 and 30 are similarly arranged and are secured together at their ends by clamps having apertured lugs 31. The adjacent coil-portions of the upper and lower coils of the pairs of coils 25—26 and 29—30 are very close together, being in fact substantially in contact with each other, as will be observed from Figs. 1 and 3. A bracket 32 is mounted on the posts 10 and 11 between the apertured lugs of the supporting clamps of the rear and front field coils. The electrical connections of the current coils are diagrammatically represented in Fig. 5, and it will be noted from this figure that while all four coils are connected in series, the direction of current flow in the lower pair of coils 25 and 29 is relatively opposite to that in the upper pair of coils 26 and 30. The magnetic field produced by the upper coils 26 and 30 is thus opposite in direction to that produced by the lower coils 25 and 29. The series-connected current or load coils 25, 26, 29 and 30 are electrically connected to the proper meter terminals T for inclusion in series relation in the consumption circuit C in which the meter is installed.

The rotatable shaft 15 of the meter carries two armatures 35 and 36 which are rotatably positioned within the influence of the magnetic fields produced by the pairs of coils 25—29 and 26—30, respectively. Each of the armatures comprises an iron core, preferably made up of semi-circular laminations interleaved at their ends to facilitate the assembling of the coils or spools constituting the armature winding. The construction of this type of armature is described in detail in my hereinbefore mentioned application. A spider 37 serves to secure the circular magnetic core of each armature to the meter shaft 15.

The direction of current flow in the upper spools or coils of the armature winding 36 is opposite to that in the lower spools or coils of the armature windings 35. The electrical connections of the coils will be clearly understood by reference to the diagram of Fig. 4, in which reference numeral 40 represents the segments of the commutator carried at the upper end of the meter shaft 15. Thus starting from the left-hand commutator segment, the electric circuit is through the upper left-hand coil of armature 36 thence through the corresponding lower left-hand coil of armature 35 in the opposite direction and to the next commutator segment. Corresponding upper and lower coils are thus connected in series and these series-connected coils are electrically connected as units to the segments of the commutator to form an upper and lower ring armature winding. The two armature windings are thus connected in series, but individual coils of the two windings are alternately connected in the series circuit, and in such a manner that the current flows in relatively opposite directions in corresponding coils of the two windings. By the use of this connection a single commutator serves both armature windings.

Brushes 41 extend from the lower ends of brush holders 42 and bear on the segments of the commutator in the well understood manner. The brush holders 42 are pivotally suspended and carry weights 43 at their outer ends which tend to turn the holders 42 on their pivots and thus hold the brushes against the commutator with a constant pressure. The brushes 41 are suitably connected to the proper terminals T of the meter so as to carry a current proportional to the voltage of the consumption circuit C. A resistance 44 is usually connected in series with the brushes, and hence in series with the armature windings to reduce the current in this circuit to a suitable value.

In my aforementioned patent application I have disclosed an adjustable magnetic member positioned between the permanent damping magnets and the motive elements of the meter for the purpose of equalizing the effects of the stray fields of the magnets on the motive elements. In the astatic meter of my present invention I employ a modified type of magnetic equalizer for equalizing the effects of local stray fields on the two motive elements of the astatic combination. This modified equalizer consists of a circular disk 46 of magnetic material, such as a sheet iron disk, centrally positioned in front of the field coils 29 and 30 so as to equalize the effects on the two armatures 35 and 36 of any local magnetic fields. The circular disk 46 is pivoted at its center to the end of a spring support 47, which in turn is adjustably mounted on the supporting post 11. The circular magnetic disk 46 catches any local lines of magnetic force and distributes these lines at a substantially uniform density over the whole area of the disk. By turning the arm 47 on its pivot about the post 11 the relative distribution of flux passing from the disk and influencing the two armatures can be proportioned so as to equalize the effects of such flux upon the two armatures. By proper adjustment of the disk in this manner stray magnetic fields can be caused to produce exactly equal effects on the two armatures, and since the armatures are magnetized in opposite directions the net resultant effect of such stray fields will be *nil*, and they will hence produce absolutely no effect on the movable system of the meter.

A light load or initial energy coil 50 is mounted on the magnetic equalizer disk 46. The coil 50 is wound of fine wire carefully insulated from the disk, and may be connected in an independent potential circuit or in the armature circuit of the meter. In the drawings I have shown the coil 50 electrically connected in series with the armature windings 35 and 36 and the resistance 44. The effect of the initial energy coil 50 can be adjusted by turning the disk 46 about its pivoted center at the end of the arm 47. The magnetic disk 46 is so magnetized by the current flowing in the coil 50 that a slight stray field is produced of opposite polarity opposite each field of each motor element of the astatic system or combination, and these stray fields are of such directions as to tend to assist the turning of the armatures, but not of such strength as will cause them to creep. The maximum effect of the initial energy coil on the two armatures will obviously be produced when the coil is in a horizontal position, and this effect is gradually diminished by moving the coil to a vertical position, in which its effect on the armatures is theoretically *nil*. In practice the coil 50 will be positioned between these two limits, and its position will be such that it will produce a field just sufficient to balance or compensate the friction effect of the bearings of the meter, thereby rendering the meter sensitive to the slight currents of the lightest loads.

The magnetic disk 46 and coil 50 thus perform two functions, first the equalizing of the effects of local stray fields on the two armatures, and second the provision of an auxiliary field for compensating for friction and no-load losses of the meter. As respects the first function, the disk 46 distributes a uniform flux of the same polarity over its whole area and the resultant action between this flux and one armature is exactly balanced or neutralized by the resultant action between this flux and the other armature. On the other hand, the stray flux of the coil 50 which affects the two armatures produces a resultant cumulative action on the movable system of the meter, because of the portion of this flux which influences one armature is of opposite polarity to the portion of this flux which influences the other armature, and the armatures themselves are also of opposite magnetic polarity.

A considerable clearance is shown in the drawings between the field coils and the armatures for the purpose of clearer illustration, but in practice this clearance is made quite small, the field coils closing in very closely to the armatures, and the two field coils on each side of the armatures thereof approximated as near as possible to each other, while the armatures themselves are at their minimum distance from each other. This is a peculiar merit of the construction employed in my improved meter, since it enables the parts of the motive elements to be brought near together and also enables the use of a short shaft for carrying the movable system. Inasmuch as the stray field effect may not be quite uniform over a considerable distance, or with respect to a considerable variation in position of the parts, it is important to have the parts which give astaticism as near as possible together, so that they will be in substantially the same field, or subject to the same strength of that field, which is the disturbing factor. In the present type of direct current meters where the armatures are made of hollow coils wound on a carrier of a considerable vertical dimension, the length of the shaft is much greater, and this condition of the approximation of the two motive elements is not possible of fulfilment, whereas with the armatures of my present meter, which represent in themselves merely disks of short axial dimensions as compared with their radial dimensions, such approximation can be made very much greater. The armatures, in fact, can be put so close together on the shaft that the space between them is occupied alone by the field coils and slight clearance. Or, in other words, the distance of the armature centers from each other can be equal to the combined thickness of the contacting portions of the two field coils on one side plus the thickness of one armature plus a small clearance space. This is a feature which has not heretofore been embodied in any meter for direct current, as far as I am aware, and is one of the particular advantages of my improved type of astatic meter.

Where the supporting arm 47 of the initial energy coil 50 is a resilient element, the coil will be moved toward the main field coils 29 and 30 under high loads and will thus tend to uplift the load curve on overloads, which may be desirable in some cases, especially when the load curve normally has a drooping characteristic. This resilient support of the initial energy coil, therefore, tends to straighten the load curve of the meter.

I have herein shown and described a particular embodiment of my invention for the purpose of explaining its principle, but numerous modifications will present themselves to those skilled in the art. I, therefore, wish to cover by the following claims all modifications within the spirit of the invention.

What I claim as new and desire to secure by Letters Patent of the United States, is:

1. A direct current electric motor meter comprising a rotatable shaft, two magnetic cores mounted on said shaft, a plurality of coils carried by each core, a commutator having a plurality of segments electrically connected to said coils so as to form two ring-wound armature windings in which the directions of current flow are relatively opposite, and a pair of oval field coils associated with each armature and arranged to produce magnetic fields of relatively opposite polarities.

2. A direct current electric motor meter comprising a rotatable shaft, two magnetic cores mounted on said shaft one above the other, a plurality of coils carried by each core, the corresponding coils on the two cores being electrically connected in series with relatively opposite directions of current flow, a commutator having a plurality of segments electrically connected to the series-connected coils so as to form two ring-wound armature windings, and field coils associated with each armature winding and arranged to produce magnetic fields of relatively opposite polarities.

3. An electric motor meter comprising a rotatable shaft, a commutator having a plurality of segments carried by said shaft, two armature windings carried by said shaft one above the other, each of said armature windings comprising a plurality of coils with corresponding coils of the two windings electrically connected in series and with such series-connected coils electrically connected as units to the segments of said commutator to form two ring-wound armature windings, and field coils associated with each armature winding.

4. An astatic electric meter comprising a rotatable shaft, a commutator having a plurality of segments carried by said shaft, two armature windings carried by said shaft one above the other, each of said armature windings comprising a plurality of coils in which corresponding coils are electrically connected in series with relatively opposite directions of current flow, the series-connected coils being electrically connected as units to the segments of said commutator to form two ring-wound armature windings, and field coils associated with each armature winding and arranged to produce magnetic fields of relatively opposite polarities.

5. A direct current electric motor meter comprising a rotatable shaft, two magnetic cores mounted on said shaft, a plurality of coils carried by each core, a commutator having a plurality of segments electrically connected to said coils so as to form two ring-wound armature windings in which the directions of current flow are relatively opposite, field coils associated with each armature winding and arranged to produce magnetic fields of relatively opposite polarities, and a magnetic member positioned near said armature windings and adapted to equalize the effects on the two armature windings of local magnetic disturbances.

6. An electric motor meter comprising a rotatable shaft, two armatures mounted on said shaft, field coils associated with said armatures, a magnetic member positioned near said armatures and adapted to equalize the effects on the two armatures of local magnetic disturbances, and an initial energy coil mounted on said magnetic member.

7. An electric motor meter comprising a rotatable shaft, two armatures mounted on said shaft, field coils associated with said armatures, means for catching the magnetic flux of local magnetic disturbances which might affect one or the other of said two armatures and distributing such flux at a substantially uniform density over a definite area, and means whereby said last mentioned means can be arranged so as to equalize the effects on said two armatures of the flux distributed from said means.

8. A direct current electric motor meter comprising a rotatable shaft, two armature windings carried by said shaft and arranged so that the direction of current flow in one is relatively opposite to that in the other, field coils associated with each armature winding and arranged to produce magnetic fields of relatively opposite polarities, and a magnetic member positioned in the path of the flux of such local magnetic disturbances as might affect one or the other of said armature windings and adapted to equalize the effects of such flux on said two armature windings.

9. A direct current electric motor meter comprising a rotatable shaft, two armature windings carried by said shaft and arranged so that the direction of current flow in one is relatively opposite to that in the other, field coils associated with each armature winding and arranged to produce magnetic fields of relatively opposite polarities, a magnetic member positioned in the path of the flux of such local magnetic disturbances as might affect one or the other of said armature windings and adapted to equalize the effects of such flux on said two armature windings, and an initial energy coil mounted on said magnetic member and adapted to produce a magnetic flux to which both of said armature windings are subjected.

10. A direct current electric motor meter comprising a rotatable shaft, two armature windings carried by said shaft and arranged so that the direction of current flow in one is relatively opposite to that in the other, field coils associated with each armature winding and arranged to produce magnetic fields of relatively opposite polarity, and a circular magnetic disk operatively positioned near said armature windings and adapted to equalize the effects on the two armature windings of local stray fields.

11. A direct current electric motor meter comprising a rotatable shaft, two armature windings carried by said shaft and arranged so that the direction of current flow in one is relatively opposite to that in the other, field coils associated with each armature winding and arranged to produce magnetic fields of relatively opposite polarity, a circular magnetic disk operatively positioned near said armature windings and adapted to equalize the effects on the two armature windings of local stray fields, and an initial energy coil mounted on said magnetic disk and adapted to produce a magnetic flux to which both of said armature windings is subjected.

12. A direct current electric motor meter comprising a rotatable shaft, two armature windings carried by said shaft and arranged so that the direction of current flow in one is relatively opposite to that in the other, field coils associated with each armature winding and arranged to produce magnetic fields of relatively opposite polarity, a circular magnetic member operatively positioned near said armature windings for equalizing the effects on the two armature windings of local magnetic disturbances, and an initial energy coil mounted on said magnetic member, said magnetic member being adjustable about its center as an axis and also about a second axis.

13. A direct current electric motor meter comprising a rotatable shaft, two magnetic cores mounted on said shaft, a plurality of coils carried by each core, a commutator having a plurality of segments electrically connected to said coils so as to form two ring-wound armature windings in which the directions of current flow are relatively opposite, field coils associated with each armature winding and arranged to produce magnetic fields of relatively opposite polarities, a circular magnetic member operatively positioned near said armature windings for equalizing the effects on the two armature windings of local magnetic disturbances, and an initial energy coil mounted on said magnetic member, said magnetic member being adjustable about its center as an axis and also about a second axis.

14. An electric motor meter comprising a rotatable shaft, two armature windings carried by said shaft, each of said armature windings comprising a plurality of coils, the coils of said windings being electrically connected in series to form two distinct windings and in such a manner that the coils of one winding are alternately arranged in the electric circuit with respect to the coils of the other winding and further so that the direction of current flow in one winding is relatively opposite to that in the other winding, and field coils associated with said armature windings and adapted to produce magnetic fields of relatively opposite polarities.

In witness whereof, I have hereunto set my hand this 31st day of March, 1916.

ELIHU THOMSON.

Copies of this patent may be obtained for five cents each, by addressing the "Commissioner of Patents, Washington, D. C."